US012066774B2

(12) United States Patent
Chiyoda et al.

(10) Patent No.: US 12,066,774 B2
(45) Date of Patent: Aug. 20, 2024

(54) FIXING APPARATUS

(71) Applicant: CANON KABUSHIKI KAISHA, Tokyo (JP)

(72) Inventors: Yasuharu Chiyoda, Chiba (JP); Masayuki Tamaki, Chiba (JP); Ryo Yashiro, Tokyo (JP); Shinsuke Takahashi, Chiba (JP); Dai Kanai, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/322,042

(22) Filed: May 23, 2023

(65) Prior Publication Data

US 2023/0408955 A1 Dec. 21, 2023

(30) Foreign Application Priority Data

Jun. 15, 2022 (JP) ................................. 2022-096338

(51) Int. Cl.
*G03G 15/20* (2006.01)

(52) U.S. Cl.
CPC ......... *G03G 15/2017* (2013.01); *G03G 15/20* (2013.01); *G03G 15/2028* (2013.01); *G03G 15/2046* (2013.01); *G03G 15/2053* (2013.01); *G03G 2215/2003* (2013.01); *G03G 2215/2016* (2013.01); *G03G 2215/2032* (2013.01); *G03G 2215/2038* (2013.01); *G03G 2215/2061* (2013.01)

(58) Field of Classification Search
CPC ............... G03G 15/20; G03G 15/2017; G03G 15/2046; G03G 2215/2003; G03G 2215/2016; G03G 2215/2032; G03G 2215/2038; G03G 2215/2061; G03G 15/2028; G03G 15/2053
See application file for complete search history.

(56) References Cited

U.S. PATENT DOCUMENTS

| | | | | | |
|---|---|---|---|---|---|
| 9,164,442 | B2 * | 10/2015 | Okabayashi ....... | G03G 15/2053 | |
| 2006/0210331 | A1 * | 9/2006 | Baba .................. | G03G 15/2053 | 399/329 |
| 2013/0251419 | A1 * | 9/2013 | Kimura .............. | G03G 15/2053 | 399/329 |

FOREIGN PATENT DOCUMENTS

| | | |
|---|---|---|
| JP | 2017083712 A | 5/2017 |

* cited by examiner

*Primary Examiner* — Joseph S Wong
(74) *Attorney, Agent, or Firm* — Canon U.S.A., Inc. IP Division

(57) ABSTRACT

A fixing apparatus includes a fixing belt, a heating roller, a nip portion forming member, a pressing rotary member, a suspending roller, and an urging unit. The heating roller is in contact with an inner surface of the fixing belt and heats the fixing belt. The suspending roller has a center and both ends in an area where the fixing belt and the suspending roller are in contact with each other in a width direction of the suspending roller. Outside diameters at both ends are greater than an outside diameter at the suspending roller center by a value between 50 micrometer and 300 micrometer, inclusive. The urging unit urges the suspending roller from the inner surface of the fixing belt toward an outer circumference surface of the fixing belt. A force that the urging unit applies to the suspending roller ranges between 50 newtons and 100 newtons, inclusive.

7 Claims, 10 Drawing Sheets

FIG.8

TABLE INVERTED CROWN SHAPE VS. IMAGE WRINKLE LEVEL

| TRIAL | AMOUNT OF REDUCING CENTER RADIUS OF SUSPENDING ROLLER | ROLLER DRIVE | IMAGE WRINKLE | DRIVE TORQUE |
|---|---|---|---|---|
| CONVENTIONAL EXAMPLE | 0 μm | DRIVEN ROTATION | WRINKLE OCCURRENCE | ACCEPTABLE |
| FIRST COMPARISON EXAMPLE | 50 μm | DRIVEN ROTATION | UNEVEN GLOSS AT CENTER | ACCEPTABLE |
| FIRST EXAMPLE, SECOND EXAMPLE | 100 μm | DRIVEN ROTATION | GOOD | ACCEPTABLE |
| SECOND COMPARISON EXAMPLE | 100 μm | WITHOUT ROTATION | GOOD | UNACCEPTABLE |
| THIRD COMPARISON EXAMPLE | 300 μm | DRIVEN ROTATION | UNEVEN GLOSS AT ENDS | ACCEPTABLE |

DRIVE TORQUE

ACCEPTABLE: TORQUE KEEPS AT LEVEL LOWER THAN OR EQUAL TO SPECIFIED VALUE DURING DESIGN TARGET PERIOD

UNACCEPTABLE: STOPPED AT TORQUE LEVEL HIGHER THAN SPECIFIED VALUE WITHIN DESIGN TARGET PERIOD

FIXING APPARATUS

BACKGROUND

Field

The present disclosure relates to fixing apparatuses that fix toner images to recording materials.

Description of the Related Art

Some image forming apparatuses each include a fixing apparatus for fixing toner images to recording materials. The fixing apparatus includes a heating rotary member for applying heat for fixing a toner image to a recording material and a pressing rotary member for applying pressure to the recording material. The heating rotary member is, for example, a rotatable endless fixing belt. The pressing roller that includes a heating source is in contact with the inner circumference surface of the fixing belt, applying heat to the fixing belt. The pressing roller forms a fixing nip portion with the fixing belt. A toner image is fixed to a recording material through the fixing nip portion through which the recording material with the toner image thereon is conveyed.

The fixing belt included in the fixing apparatus can slacken due to insufficient tension suspending the fixing belt. In addressing this, Japanese Patent Application Laid-Open No. 2017-083712 discusses a configuration in which a suspending roller for suspending a fixing belt is disposed upstream of a fixing nip portion in the direction of rotation of the fixing belt to apply tension to the fixing belt. This reduces slack in the fixing belt, reducing occurrences of wrinkle in recording materials.

With the demand for high speed printing in recent years, there is a proposal of a wider fixing nip portion. With this configuration, the above-described slack and wrinkle can remarkably occur in the fixing belt, degrading the quality of toner images formed on recording materials.

SUMMARY

The present disclosure is directed to reduction of occurrences of slack and wrinkle in a fixing belt, providing a higher quality of toner images.

According to an aspect of the present disclosure, a fixing apparatus includes a fixing belt that is rotatable and is configured to heat a recording material, a heating roller configured to be in contact with an inner surface of the fixing belt and to heat the fixing belt, a nip portion forming member configured to be in contact with the inner surface of the fixing belt and to suspend the fixing belt, a pressing rotary member configured to form a nip portion by pressing the nip portion forming member via the fixing belt, wherein, with the fixing belt, the pressing rotary member is configured to pinch and convey the recording material and fix a toner image to the recording material, a suspending roller that is disposed upstream of the nip portion forming member and downstream of the heating roller in a direction of rotation of the fixing belt and configured to suspend the fixing belt, wherein the suspending roller has a center and both ends in an area where the fixing belt and the suspending roller are in contact with each other in a width direction of the suspending roller, and wherein outside diameters at both of the ends of the suspending roller are greater than an outside diameter at the suspending roller center by a value between 50 micrometer (μm) and 300 μm, inclusive, and an urging unit configured to urge the suspending roller from the inner surface of the fixing belt toward an outer circumference surface of the fixing belt, wherein, in applying a force, the force that the urging unit applies to the suspending roller ranges between 50 newtons (N) and 100 N, inclusive.

BRIEF DESCRIPTION OF THE DRAWINGS

FIG. 8 is a comparison table of effects according to the present exemplary embodiment.

DESCRIPTION OF THE EMBODIMENTS

An exemplary embodiment of the present disclosure will be described below with respect to the accompanying drawings. Examples will be described below in which the exemplary embodiment is applied to a full-color electrophotographic image forming apparatus that includes a plurality of photosensitive drums; however, the exemplary embodiment is not limited to these examples, and can be applied to various types of image forming apparatus, and monochrome image forming apparatuses.

<Image Forming Apparatus>

The configuration of an image forming apparatus according to an exemplary embodiment will be generally described with reference to FIG. 1.

Figure 1:
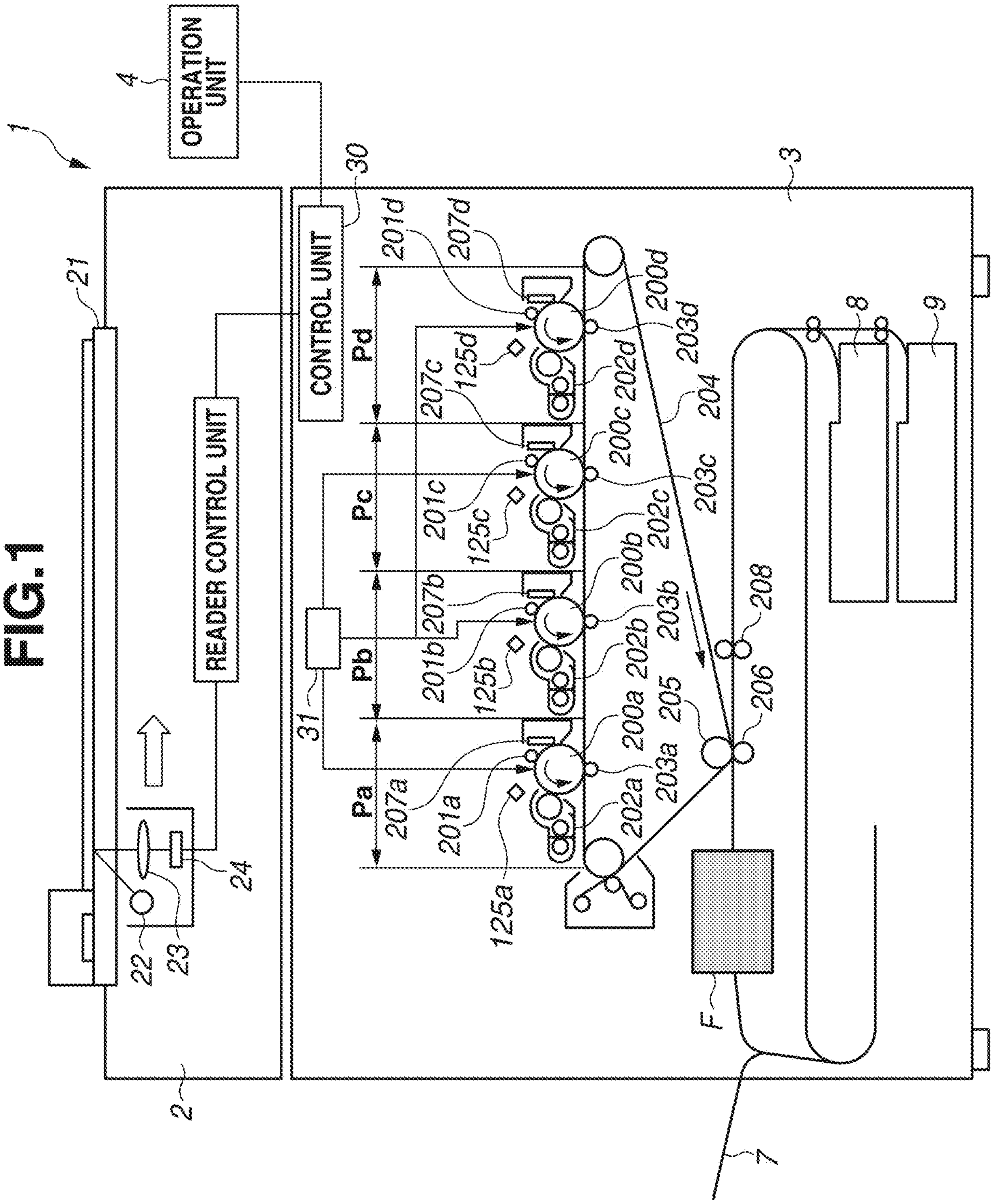
FIG. 1 is a schematic view of an image forming apparatus according to an exemplary embodiment.

FIG. 1 illustrates a full-color image forming apparatus 1 according to the present exemplary embodiment. The image forming apparatus 1 includes an image reading unit 2 and an image forming apparatus main body 3. The image reading unit 2 reads an original document placed on an original platen glass 21. Light emitted from a light source 22 reflects on the original document, and through an optical member 23, such as a lens, the light forms an image on a charge coupled device (CCD) sensor 24. While scanning in the direction of the arrow, such an optical unit coverts the read original document into electric signal data strings line by line. The image signals from the CCD sensor 24 are sent to the image forming apparatus main body 3, and go through image processing for individual image forming units, which will be described below, performed by a control unit 30. Further, the control unit 30 receives external inputs from an external host device, such as a print server, as image signals.

The image forming apparatus main body 3 includes a plurality of image forming units, Pa, Pb, Pc, and Pd. In each image forming unit, an image forming process is performed based on the image signals described above. The image signals are converted into pulse-width modulated (PWM) laser beams by the control unit 30. In FIG. 1, a polygon scanner 31 as an exposure unit emits laser beams based on the image signals and performs scanning. The laser beams strike photosensitive drums 200*a*, 200*b*, 200*c*, and 200*d* as image bearing members of the image forming units Pa, Pb, Pc, and Pd, respectively. Specifically, the image forming units Pa, Pb, Pc, and Pd are yellow (Y), magenta (M), cyan (C), and black (Bk) image forming units, respectively, and each image forming unit forms images in the corresponding color. The image forming units Pa, Pb, Pc, and Pd have substantially the same configuration. The following is a detail description of the yellow image forming unit Pa, and the description of the other image forming units will be omitted. The Y image forming unit Pa includes the photosensitive drum 200*a*, on which a toner image is formed based on image signals, which will be described.

A primary charging unit 201*a* charges the photosensitive drum 200*a* to a predetermined potential. The laser beams emitted from the polygon scanner 31 form an electrostatic latent image on the photosensitive drum 200*a* with the predetermined charged potential. A developing unit 202*a* develops the electrostatic latent image on the photosensitive drum 200*a* to form a toner image. A transfer roller 203*a* applies a primary transfer bias of the polarity opposite to that of the toner with electric discharging from the outer surface of the intermediate transfer belt 204, to an intermediate transfer belt 204. This transfers the toner image on the photosensitive drum 200*a* onto the intermediate transfer belt 204. The surface of the photosensitive drum 200*a* is cleaned with a cleaner 207*a* after the transfer.

The toner image on the intermediate transfer belt 204 is conveyed to the next image forming units, and at each of the image forming units, toner images of the image forming units are transferred on the intermediate transfer belt 204 in the order of yellow, magenta, cyan, and black, forming a four-color image on the surface of the intermediate transfer belt 204. The toner image through the Bk image forming unit is secondarily transferred on a sheet P by a secondary transfer electric field of the polarity opposite to that of the toner image being applied to the intermediate transfer belt 204 at a secondary transfer portion formed by a pair of secondary transfer rollers 205 and 206. After waiting at a registration unit 208, the sheet P fed from a sheet feeding cassette 8 or 9 is conveyed so that the toner image on the intermediate transfer belt 204 and the position of the sheet P match each other. After that, the toner image on the sheet P is fixed to the sheet P by a fixing apparatus F as an image heating apparatus. The sheet P through the fixing apparatus F is discharged to the outside of the image forming apparatus 1. In a duplex job, after the transfer and fixing processes on the toner of the first image forming side (first side) are completed, the sheet P is conveyed and then reversed upside-down through a reversing unit provided in the image forming apparatus 1. After that, toner is transferred on and then fixed to the second image forming side (second side). The sheet P is discharged to the outside of the image forming apparatus 1, and is put on a discharge tray 7.

<Fixing Apparatus>

The fixing apparatus F according to the present exemplary embodiment will now be described with reference to FIG. 2.

Figure 2:
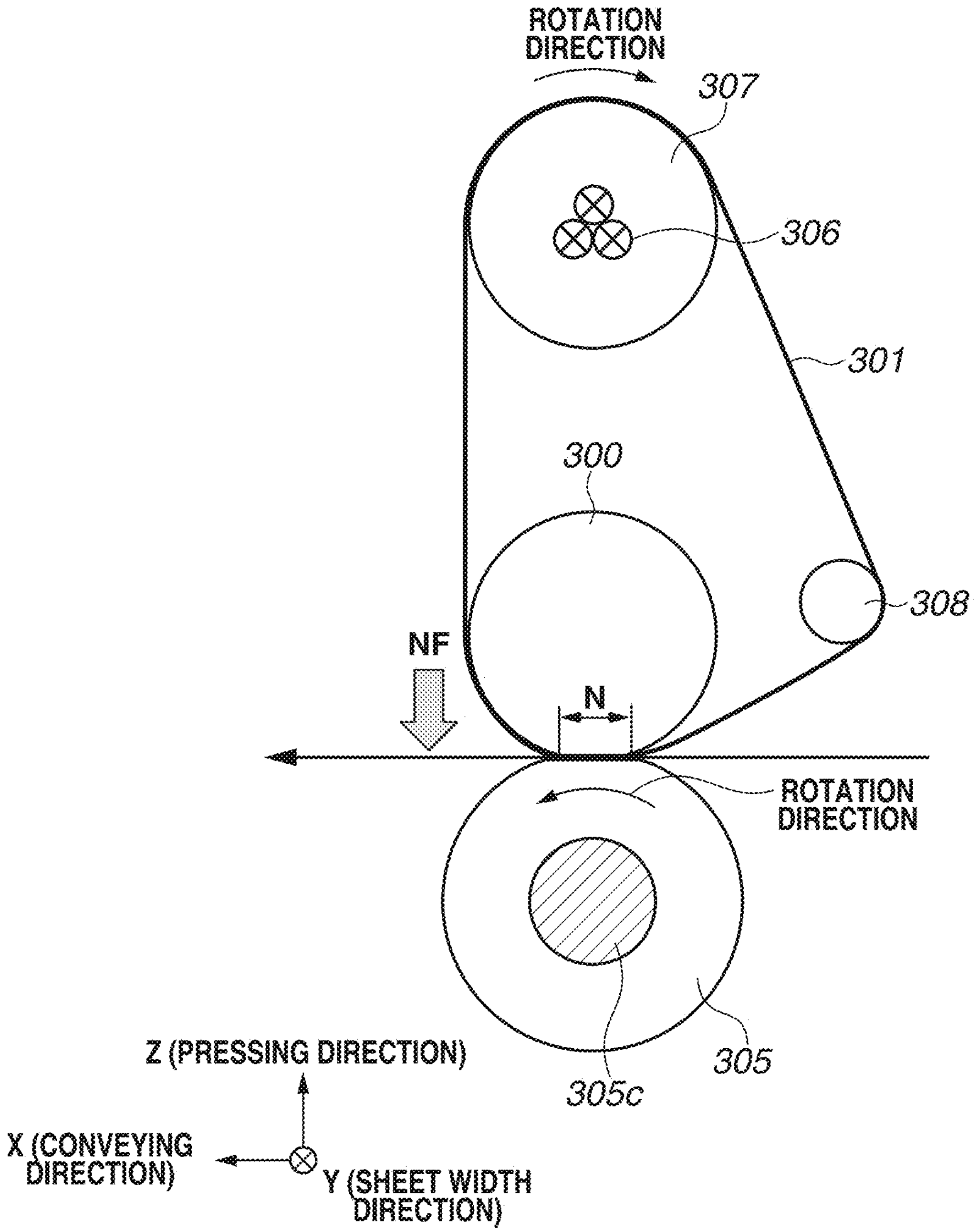
FIG. 2 is a cross-sectional view illustrating a fixing apparatus in a first example according to the present exemplary embodiment.

FIG. 2 is a schematic view illustrating the overall configuration of the fixing apparatus F that employs a belt-heating method, as a first example according to the present exemplary embodiment. In FIG. 2, an X direction represents the direction of conveying the sheet P (not illustrated), a Y direction represents the direction of the width of the sheet P, and a Z direction refers to the direction of pressing.

The fixing apparatus F includes a fixing belt (hereinafter, sometimes referred to as a belt) 301 as a heating rotary member in an endless belt form. The fixing apparatus F further includes a fixing roller 300 that supports the fixing belt 301 inside, a heating roller 307, a suspending roller 308, a heating roller 305 as a pressing rotary member opposed to the fixing roller 300. The heating roller 305 presses the fixing roller 300 via the fixing belt 301 to form the nip portion N with the fixing belt 301.

The belt 301 is a thermal conductive and heatproof belt with other characteristics, and has a thin cylindrical shape. In the present exemplary embodiment, the fixing belt 301 has a three layer structure composed of a base layer, an elastic layer over the outer circumference of the base layer, and a mold release layer over the outer circumference of the elastic layer. The base layer is a polyimide (PI) material with a thickness of 80 μm. The elastic layer is formed of silicone rubber with a thickness of 300 μm. The mold release layer is formed of tetrafluoroethylene-perfluoro-alkoxyethylene (PFA) copolymer resin as a fluorine resin with a thickness of 30 μm. The belt 301 is suspended by the fixing roller 300 (nip forming material), the heating roller 307, and the suspending roller 308. The outside diameter of the fixing belt 301 is 150 mm. The fixing roller 300 is pressed via the fixing belt 301 by the pressing roller 305. The fixing roller 300 is a core metal formed with, for example, steel special use stainless (SUS), copper, or aluminum. In the present exemplary embodiment, the fixing roller 300 is formed using an aluminum hollow cylinder. The aluminum cylinder is covered with heatproof silicone rubber of 10 degrees in Japanese Industrial Standards (JIS)-A hardness with a thickness of 20 mm, and the silicone rubber is further coated with polytetrafluoroethylene (PTFE) with a thickness of 20 μm, as an elastic layer of the surface portion. The roller hardness of the fixing roller 300 in the above configuration ranges from 30 degrees to 35 degrees in ASKER-C hardness. The outside diameter of the fixing roller 300 is 70 mm, for example. The above configuration is an example. Other configurations may be used as long as the surface layer is wear resistant and heatproof, and has a hardness that allows a sufficient nip width to be formed.

The heating roller 307 is a SUS pipe with a thickness of 1 mm, and includes a halogen heater 306 as a heat source inside that allows generation of heat up to a predetermined temperature. The belt 301 is configured to be heated by the heating roller 307.

The heating roller 307 rotates around one end or about its center relative to the fixing belt 301, generating a tension difference ahead and behind, controlling the position of the fixing belt 301 in the main scanning direction. In addition, the heating roller 307 is urged by a spring supported by a heating unit frame (not illustrated), and also functions as a tension roller to apply a predetermined tension to the fixing belt 301.

The pressing roller 305 is composed of a core metal layer 305C, an elastic layer over the core metal layer 305C as its shaft, and a mold release layer over the elastic layer. The shaft is formed of a SUS material with a diameter of 72 mm. The elastic layer is formed of electrically conductive silicone rubber with a thickness of 8 mm. The mold release layer is formed of PFA copolymer resin as a fluorine resin with a thickness of 100 μm. The pressing roller 305 is shaft-supported with a fixing frame (not illustrated) of the fixing apparatus F. One end of the pressing roller 305 is fixed to a gear connected to a drive source (not illustrated) that rotationally drives the pressing roller 305.

The sheet P with the toner image thereon is pinched and conveyed through the nip portion N formed between the fixing belt 301 and the pressing roller 305 through which the toner image is fixed to the sheet P. Thus, the fixing apparatus F fixes the toner image to the sheet P while conveying the sheet P being pinched. The pressing roller 305 is pressed via the fixing belt 301 against the fixing roller 300 by a drive source (not illustrated). Toner images are fixed to recording materials with a pressing force (NF) of 1,600 N at the nip portion N. The nip portion N has a set width of 20 mm in the X direction (conveyance direction), and a set width of 336 mm in the Y direction (sheet width direction).

The suspending roller 308 is also used to secure a sufficient length of the fixing belt 301. In addition, the suspending roller 308 is used to allow the fixing belt 301 to have tension. This reduces occurrences of wrinkle in recording materials. The suspending roller 308 is a SUS hollow pipe with a thickness of 1 mm, and is rotatably driven by the fixing belt 301.

The suspending roller 308 is disposed upstream of the nip portion N in the direction of the rotation of the fixing belt 301, and is in pressure contact with the inner surface of the fixing belt 301 such that the suspending roller 308 presses the fixing belt 301 from the inside toward the outside. The fixing belt 301 is suspended by a plurality of members including the fixing roller 300 as a nip forming member. The suspending roller 308 and the fixing roller 300 are arranged next to each other. The words "next to each other" means that there is no member suspending the fixing belt 301 between the fixing roller 300 and the suspending roller 308.

The surface roughness of the suspending roller 308 is an arithmetic mean surface roughness Ra of 0.05 μm, which means a relatively smooth condition. The suspending roller may have a higher surface roughness as long as the driving torque of and wear in the inner surface of the fixing belt 301 are acceptable. For example, a rubber member may be used to form the surface.

<Mechanism of Paper Wrinkle Occurrence>

Figure 6:
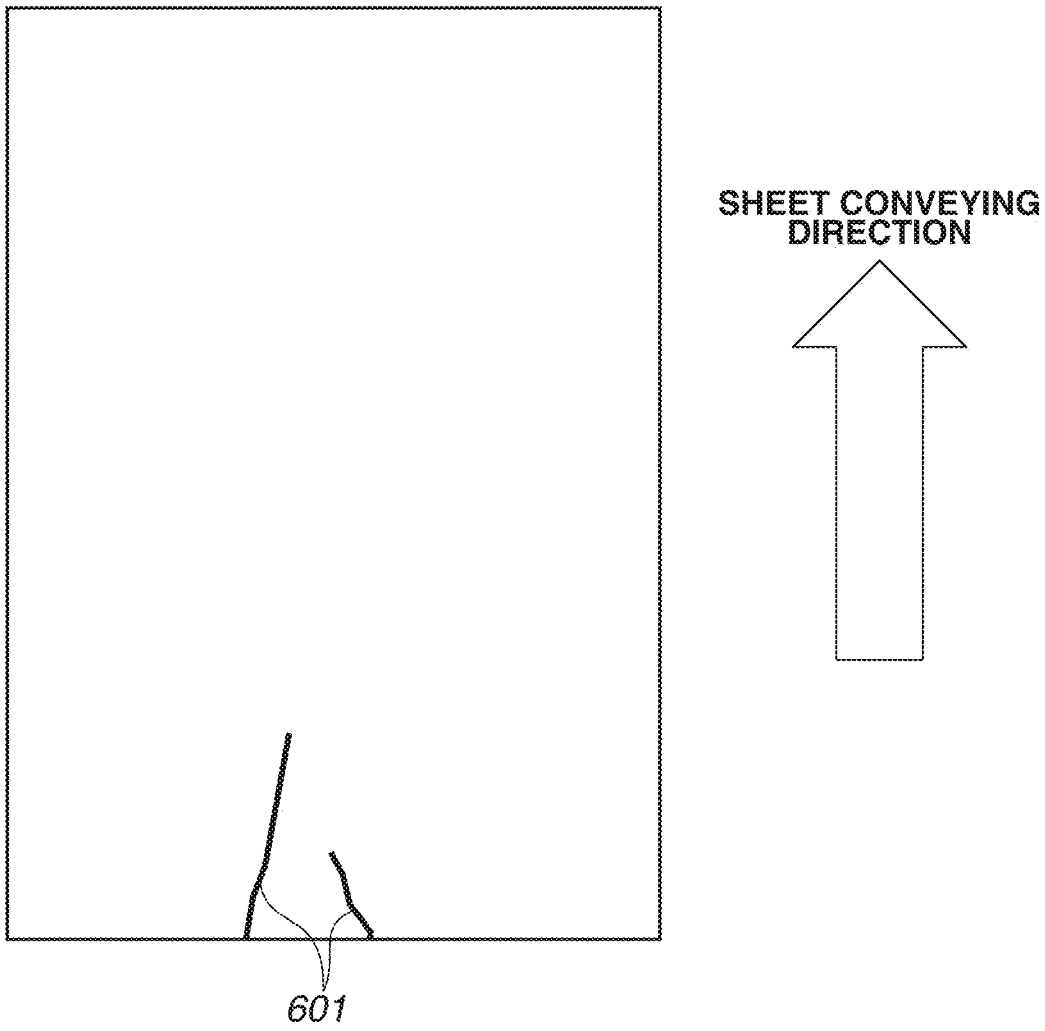
FIG. 6 illustrates paper wrinkle occurrence portions.

A mechanism of paper wrinkle occurrence as illustrated in FIG. 6 will now be described.

Figure 5:
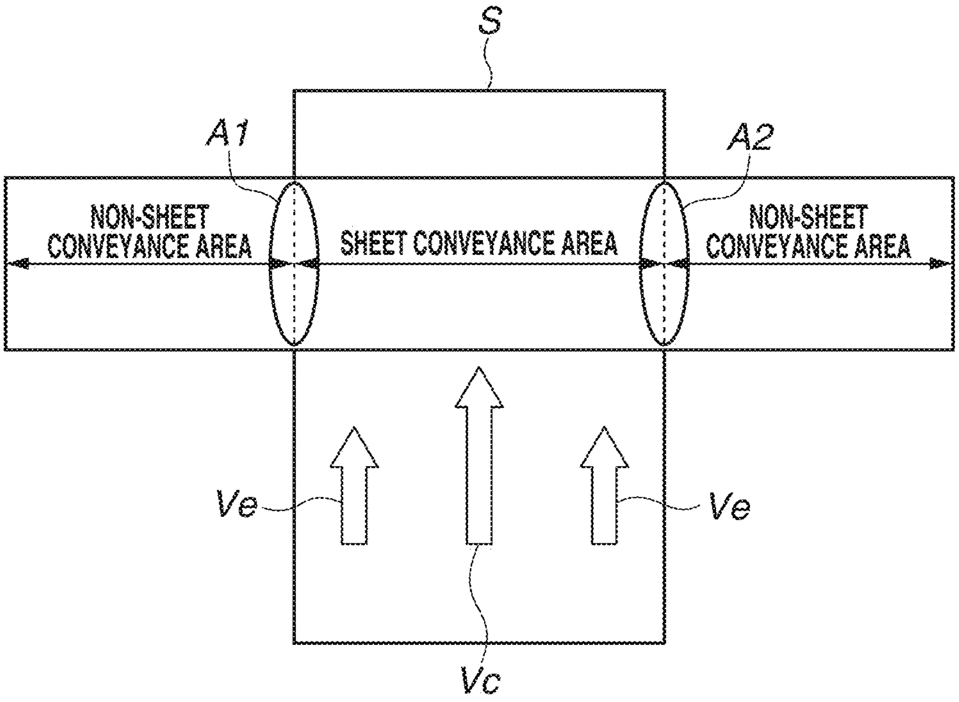
FIG. 5 illustrates a paper wrinkle occurrence mechanism according to the present exemplary embodiment.

FIG. 5 illustrates the mechanism of paper wrinkle occurrence.

When the image forming apparatus 1 is started after its power it turned on, both ends of the pressing roller 305 tends to dissipate more heat than its center in the direction of the width of the pressing roller 305 (orthogonal to the direction of conveyance of recording materials). This results in a higher temperature of its center than the temperature of its ends, making the outside diameter of its center larger than those of its ends, which is a crown shape.

The pressing roller 305 in such a crown shape conveys a recording material at a higher speed at its center of Vc than at a speed at its ends of Ve. Lengths of arrows representing conveying velocities represent their conveying speeds. The arrows in FIG. 5 indicate that the recording material travels fast at its center and slow at its ends. The difference in conveying velocity causes stress (stress like ends are being pulled inwardly) in the center part in the lower half of the recording material.

As a result, paper wrinkle as illustrated in FIG. 6 is likely to occur.

The fixing apparatus F according to the present exemplary embodiment reduces the difference in conveying velocity of recording materials in the width direction through the fixing nip portion, reducing occurrences of wrinkle in the recording materials. The details of the present disclosure will now be described.

<Shape of Suspending Roller>

The suspending roller 308 that suspends the fixing belt 301, according to the present exemplary embodiment, forms in an inverted crown shape. In other words, the suspending roller 308 has a smaller outside diameter at its center than the outside diameters at its ends in the sheet conveyance area in the width direction. This generates higher stress at the ends of the part of the fixing belt 301 that has passed the suspending roller 308 than at its center in the width direction. This makes the sheet conveying speed at the ends of the fixing belt 301 higher than that at its center. This configuration reduces occurrences of paper wrinkle, which occurs as conventionally, a recording material travels at higher speed at its center than at its ends in the fixing nip portion. The shape of the suspending roller 308 and the fixing belt 301 will be described in detail.

The following table illustrates details of suspending rollers used in verification.

TABLE 1

Combinations of each suspending roller

| Exemplary embodiment | Name | dc (diameter at center) [mm] | de (diameter at ends) [mm] |
|---|---|---|---|
| Conventional example | Straight roller | 20.0 | 20.0 |
| First comparison example | 50-μm smaller center radius roller | 19.9 | 20.0 |
| First example, second example | 100-μm smaller center radius roller | 19.8 | 20.0 |
| Second comparison example | Fixed 100-μm smaller center radius roller | 19.8 | 20.0 |
| Third comparison example | 300-μm smaller center radius roller | 19.4 | 20.0 |

A plurality of suspending rollers were used in verification. In a conventional example, the suspending roller had a straight shape (an outside diameter common to its center and its ends) with a diameter of 20.0 mm. In the first example for verification of the effect according to the present exemplary embodiment, the suspending roller had a diameter at its center of 19.8 mm and a diameter at its ends of 20.0 mm, a 100 μm-smaller center radius at one end. In addition, a 50 μm-smaller center radius suspending roller as a first comparison example and a 300 μm-smaller center radius suspending roller as a third comparison example were used. Furthermore, in a second comparison example, a configuration in which the suspending roller that was fixed would slide on the belt surface without rotation of the suspending roller was used in verification.

Figure 4:
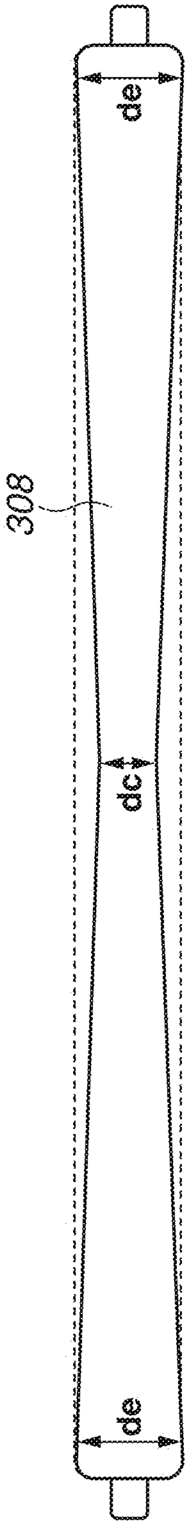
FIG. 4 illustrates the outside diameter of a suspending roller according to the present exemplary embodiment.

Any shape between the center and the ends of a member may be used as long as its diameter monotonously increases or decreases whereas the diameter at its center is smallest. If there is no corner part, the center and the ends may be connected to each other in a straight line. Given the stabilization of the running fixing belt, the center and the ends of a roller member are ideally connected to each other in a smooth arc shape like the outside diameter of the roller member illustrated in FIG. 4. The center refers to a center in the width direction in the sheet conveyance area of recording materials. The ends refer to ends in the width direction in the sheet conveyance area of recording materials. Thus, the shape outside the sheet conveyance area does not matter.

Figure 7:
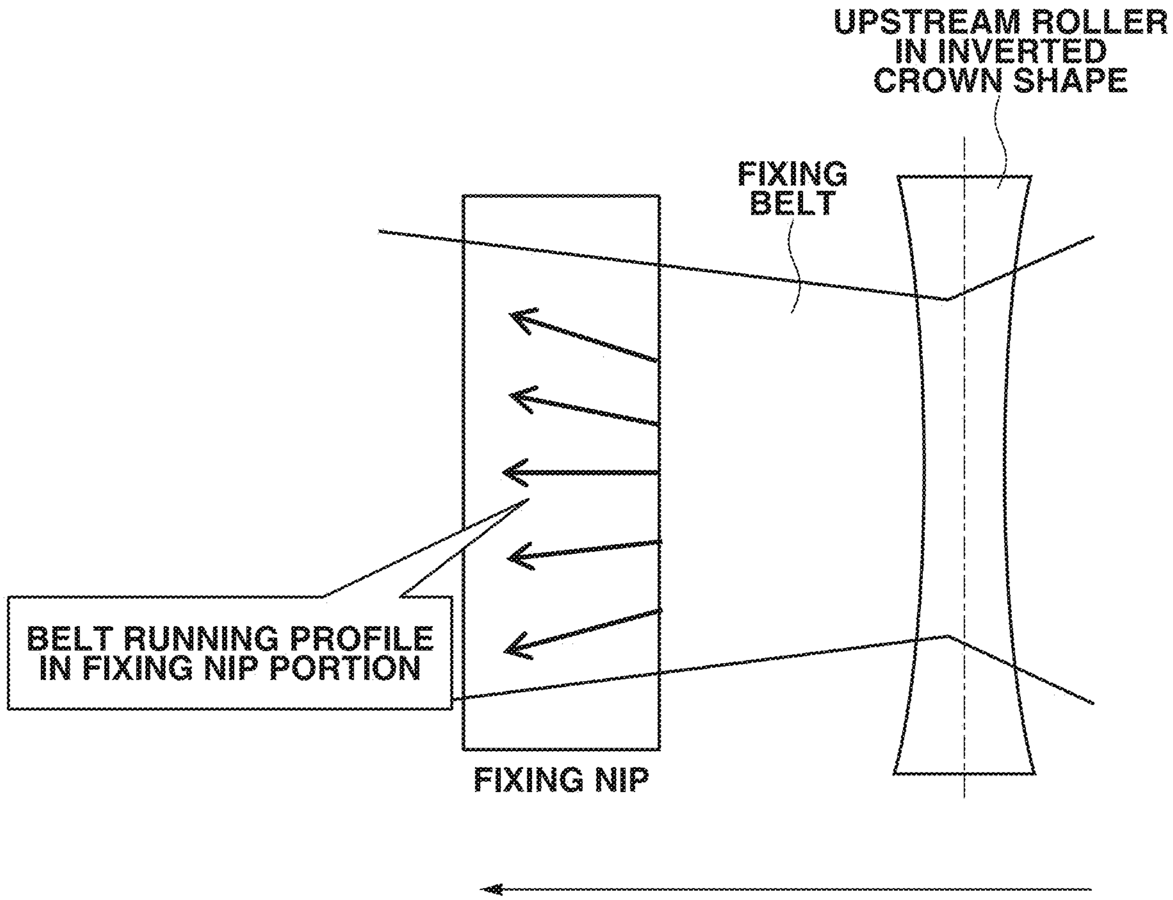
FIG. 7 illustrates a paper wrinkle reduction effect according to the present exemplary embodiment.

A smaller radius at the center of the suspending roller 308 illustrated in FIG. 7 causes the fixing belt 301 after entering the fixing nip portion N to be conveyed while the fixing belt 301 is being pulled stretching outwardly through the fixing nip portion N. A recording material is being conveyed following the fixing belt 301 like the recording material is being pulled outwardly along arrows illustrated in FIG. 7, thereby reducing occurrences of paper wrinkle.

<Verification Experiment 1>

The effect of the configuration of the fixing apparatus F according to the exemplary embodiment was checked for verification.

First, the verification through the conveyance of sheets will be described.

A continuous sheet supply experiment in a duplex mode was performed with sheets of OK top coat+made by Oji Paper Co., Ltd., which is long grain paper that is 79.1 $g/m^2$ in basis weight with a width of 330 mm and a length of 483 mm. A single, solid 100%-black image was formed over the whole (320 mm in width) of a sheet in the experiment. The printed images were checked for uneven gloss and paper wrinkle (Table in FIG. 8).

In the experiment, a plurality of smaller center radius levels, as amounts of reducing the center radius, of suspending rollers were prepared for the comparison examples to check differences from the first example. FIG. 8 illustrates the result of the experiment. It was confirmed that paper wrinkle that occurred in the conventional example was improved in the first example. In addition, an excessive smaller center radius suspending roller caused uneven gloss on some sheets because the difference in sheet conveying velocity was excessively reversed, causing defective conveyance at the ends of the sheets.

Furthermore, it was discovered that the countermeasure effect against paper wrinkle was achieved even with a fixed suspending roller as a fixed member due to a smaller radius at its center. A fixed member will slide with its surface in contact with a belt. The fixed member is disadvantageous to endurance life, but the fixed member is usable depending on the configuration.

As a method for verifying the effect, a method of measuring sheet conveying velocities at the center and the ends is conceivable. A sheet with a plurality of cuts therein in the width in strips was prepared with position marks put on its surface. Absolute values of and differences between a sheet conveying velocity at the center and sheet conveying velocities at the ends are measurable by measuring times at the same position of the strips at points where the strips enter the nip portion and at points where the strips are discharged from the nip portion and plotting the velocities of the sheet passing through the nip portion in the longitudinal direction. Paper wrinkle and uneven gloss occur with an unacceptable value of a larger difference in sheet conveying velocity due to the sheet rigidity. The sheet conveying velocity is optimized such that the following relationships are satisfied: Center sheet conveying velocity$\times$n<end sheet conveying velocity$\leq$center sheet conveying velocity, where n is a coefficient less than 1, and is variable with rigidity in the cross direction (CD) of a sheet, and where with a Gurley hardness of 0.30 mN, n$\approx$0.99.

Verification by simulation will now be described.

Figure 9:
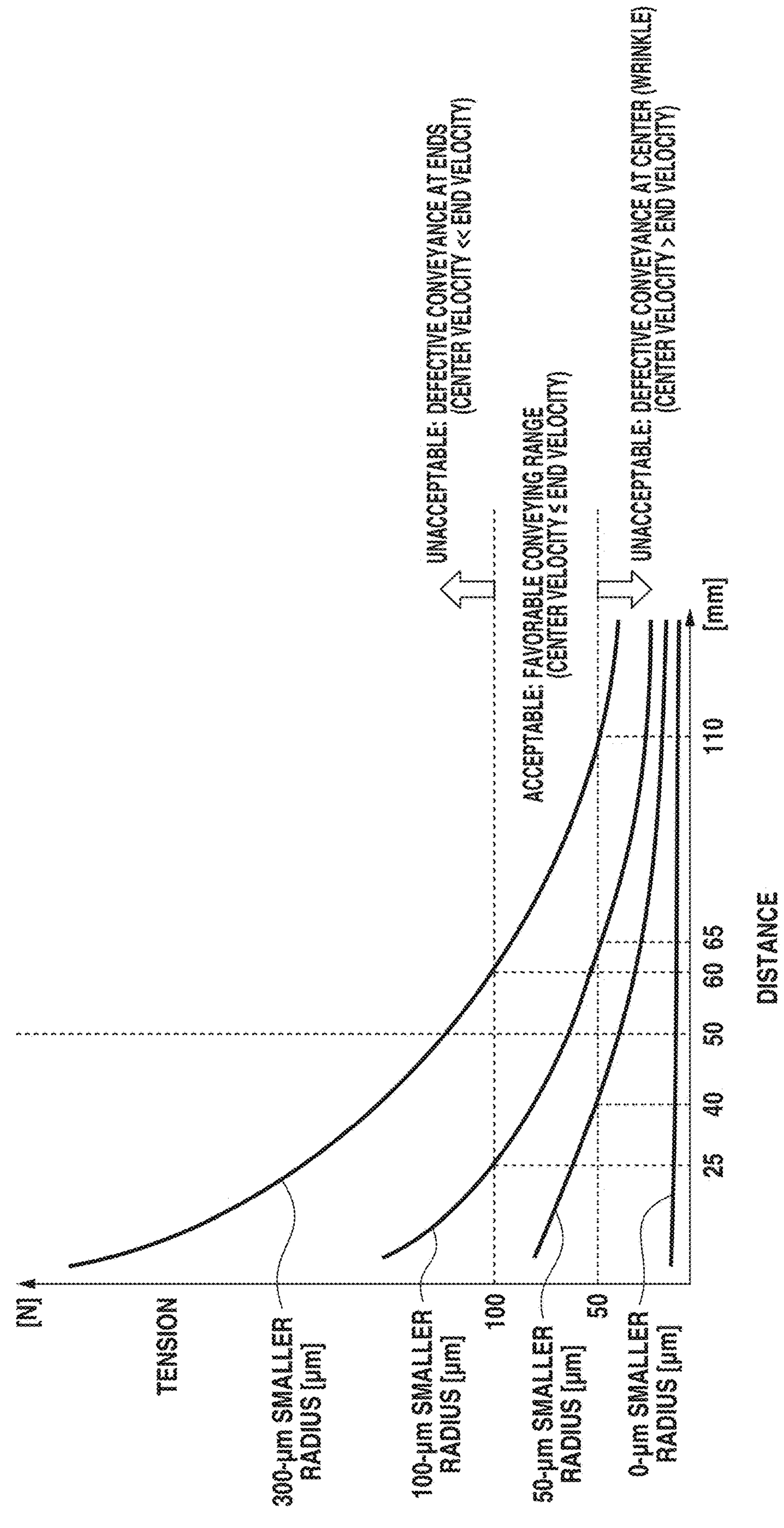
FIG. 9 is a graph illustrating a position-tension relationship with suspending rollers in inverted crown shapes.

Sheet behavior simulation calculation was performed with the configuration in the first example and the configuration in the conventional example. FIG. 9 is a graph of estimated tensions as forces with which the suspending roller 308 pushes the fixing belt 301 (forces generated at the fixing belt 301 from the center toward the outside). The distance between the fixing nip portion N and the suspending roller 308 in the present exemplary embodiment was approximately 50 mm as a condition. At this distance, it was understood that a 100 μm smaller center radius suspending roller had the effect. An excessive lower tension leaves the end sheet conveying velocities slow, likely to cause paper wrinkle due to deformed paper. An excessive higher tension makes the center sheet conveying velocity much slower than the end sheet conveying velocities, causing uneven gloss due to minute slips by stress at the ends of sheets. Thus, paper wrinkle is improved with a smaller center radius shape. Furthermore, a smaller center radius shape in the appropriate range provides more stable sheet conveying velocities, preventing uneven gloss.

As illustrated in FIG. 9, a favorable sheet conveying range is determined depending on the tension of the suspending roller 308. Specifically, the tension is between 50 N and 100 N, inclusive. With a tension of lower than 50 N, the center conveying velocity of a recording material in the width direction is greater than the end conveying velocities, which can cause paper wrinkle. This is because a low tension is exerted on the fixing belt 301, preventing the end conveying velocities in the width direction from being sufficiently great compared with the center conveying velocity. On the other hand, with a tension of higher than 100 N, the end conveying velocities of a recording material in the width direction is excessively great, causing paper wrinkle. Thus, in the present exemplary embodiment, the tension between 50 N and 100 N, inclusive, is appropriate. The suspending roller 308 of which the outside diameter of the ends is made larger by a value between 50 μm and 300 μm, inclusive, than the outside diameter of the center allows the tension to come in the predetermined range, reducing occurrences of paper wrinkle.

In addition, in the present exemplary embodiment, the verification was performed using the suspending rollers 308 each for the first example, the first comparison example, and the third comparison example, respectively, and the relationship between the distance between the fixing nip portion N and the suspending roller 308 and the tension varied with the amount of inverted crown, as illustrated in FIG. 9. Specifically, the distance between the nip portion N and the suspending roller 308 is from the downstream end of the contact range between the suspending roller 308 and the fixing belt 301 to the upstream end of the fixing nip portion N in the direction of rotation of the fixing belt 301. With the same distance between the fixing nip portion N and the suspending roller 308, a larger amount of inverted crown causes a greater tension. Thus, in the present exemplary embodiment, the distance between the fixing nip portion N and the suspending roller 308 in the range between 25 mm and 110 mm, inclusive, brings the tension into the range from 50 N to 100 N, although this depends on the amount of inverted crown.

Figure 10:
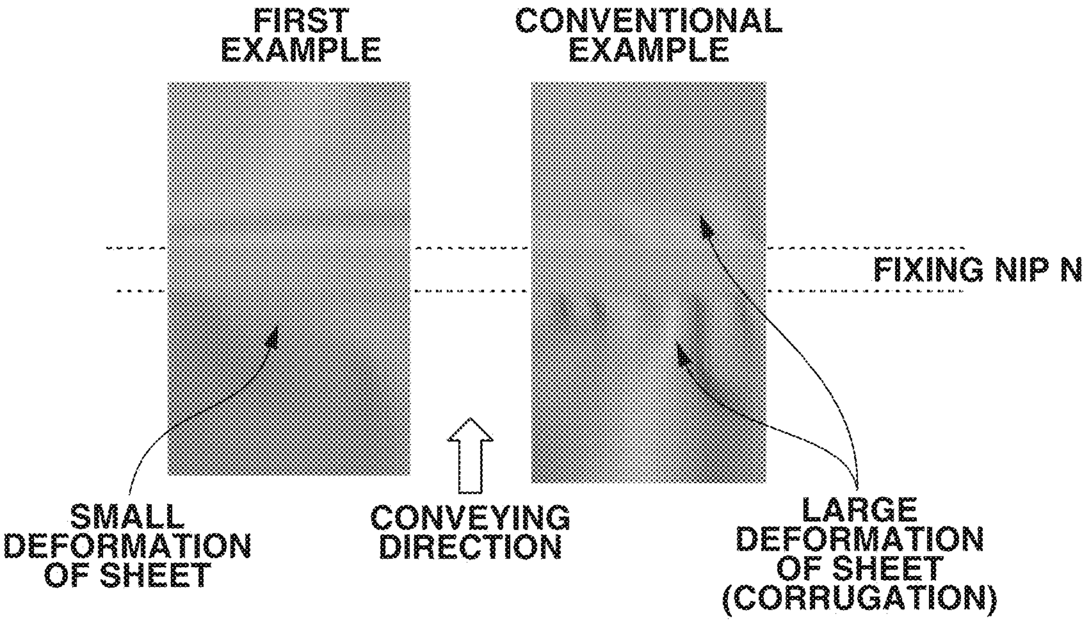
FIG. 10 are comparison images obtained by sheet shape simulation of images ahead and behind a fixing nip portion under conditions of a conventional example and the first example according to the present exemplary embodiment.

Sheet shape profiles ahead and behind the fixing nip portion N will be illustrated in FIG. 10 as a result of the simulation in this case. The sheet shape profiles that are visualized indicates an occurrence of corrugation created by stress that significantly deforms the sheet ahead and behind the fixing nip portion N in the conventional example and a stable conveyance in the present example.

Other than the conditions in the present example, a member in an inverted crown closest to the upstream end of the nip portion N will have an effect of reducing occurrences of paper wrinkle. The effect is more likely to be produced with a shorter distance between the suspending roller 308 and the fixing nip portion N and with a higher Young's modulus of the fixing belt 301.

The inverted crown shape of the suspending roller 308 varies with the width of the fixing nip portion N and the stiffness of the fixing belt 301 (the Young's modulus of the base layer). A narrower width of the fixing nip portion N results in a shorter distance in which a recording material is being pulled outwardly, reducing the correction of paper wrinkle, which is likely to cause paper wrinkle. A narrower width of the fixing nip portion N therefore accompanies a larger amount of inverted crown of the suspending roller 308. On the other hand, a wider width of the fixing nip portion N accompanies a smaller amount of inverted crown of the suspending roller 308. A higher stiffness (solidity) of the fixing belt 301 makes the fixing belt 301 follow the shape of a pad less appropriately, causing a shorter outwardly stretching length of the fixing belt. This reduces the outward pull of a recording material, causing paper wrinkle. For this reason, a higher stiffness of the fixing belt 301 accompanies a larger amount of inverted crown of the suspending roller 308. A lower stiffness of the fixing belt 301 accompanies a smaller amount of inverted crown of the suspending roller 308.

As described above, the optimum amount of inverted crown D [mm] of suspending roller 308 depends on the width [mm] of the fixing nip portion N and the stiffness (Young's modulus [GPa]) of the base material of the fixing belt 301, which is illustrated in Table 2.

TABLE 2

Optimum amounts of inverted crown with nip widths and pressing forces

| | | Young's modulus of belt [GPa] | | |
|---|---|---|---|---|
| Amount of inverted crown [μm] | | 3 | 5 | 7 |
| Nip width[mm] | 20.0 | 210 | 190 | 170 |
| | 24.5 | 170 | 150 | 130 |
| | 30.0 | 110 | 90 | 70 |

The optimum amounts of inverted crown of the suspending roller in Table 2 are numeric values obtained by simplifying numeric values as calculation results using ABAQUS as software for finite element method analysis for structural calculation.

The following is simulation conditions:

The conditions of the fixing belt 301 include 150 mm of its outside diameter, 300 μm of its elastic layer thickness, 0.4 MPa of the Young's modulus of its elastic layer, 80 μm of the thickness of its base material, and 5 GPa of the Young's modulus of its base material; the conditions of the pressing roller 305 include 80 mm of its outside diameter, 8 mm of the thickness of its elastic layer, and 0.6 MPa of the Young's modulus of its elastic layer; and, the other conditions include 80 to 160 kgf of the total load, and 450 mm/s of the rotation speed. Using regression analysis under these conditions enables the relationship between the nip width [mm] and the Young's modulus [GPa] to be expressed using a linear expression in a relatively simple way. When the amount of reducing the center radius is denoted by D [μm], the width of the fixing nip portion N is denoted by N [mm], and the Young's modulus of the fixing belt 301 is denoted by E [GPa], the relationship between D, N, and E is expressed using the following expression: $D=-10\times N-9.5\times E+440$. This expression is a relation with the combination of the configurations in the present example. The values can vary with a plurality of peripheral parameters, but the magnitude relationship of the values and the values themselves are approximately correct.

In consideration of the range of the amount of reducing the center radius that can improve paper wrinkle with respect to the optimum amounts, the effect of improving paper wrinkle as the result from the simulation has a tolerance range of ±100 μm in amount of inverted crown. The effect in the present exemplary embodiment is achievable by determining the amount of reducing the center radius D [μm] using the following relations:

$$-10\times N-9.5\times E+340<D$$

$$D<-10\times N-9.5\times E+540$$

In the present exemplary embodiment, both ends of the suspending roller 308 are thicker than its center in the width direction. This shape makes the sheet conveying velocities at both ends faster than at the center. However, through continuous rotation of the fixing belt 301, corrugation can occur in the fixing belt 301 because the sheet conveying velocities at both ends of the fixing belt 301 are excessively faster than at the center. To address this, the heating roller 307 of which the outside diameter of the center is larger than at the ends may be used. Modifications may be made on the outside diameter of the fixing roller 300. However, a change of the outside diameter of the fixing roller 300, which forms the fixing nip portion N, can change a pressure distribution in the nip portion N, which is not favorable. Thus, to stabilize the sheet conveying velocities in the width direction of the fixing belt 301, it is desirable to make modifications on the outside diameter of the heating roller 307 and the outside diameter of the suspending roller 308.

The configuration of a fixing apparatus F in a second example will now be described with reference to FIG. 3.

Figure 3:
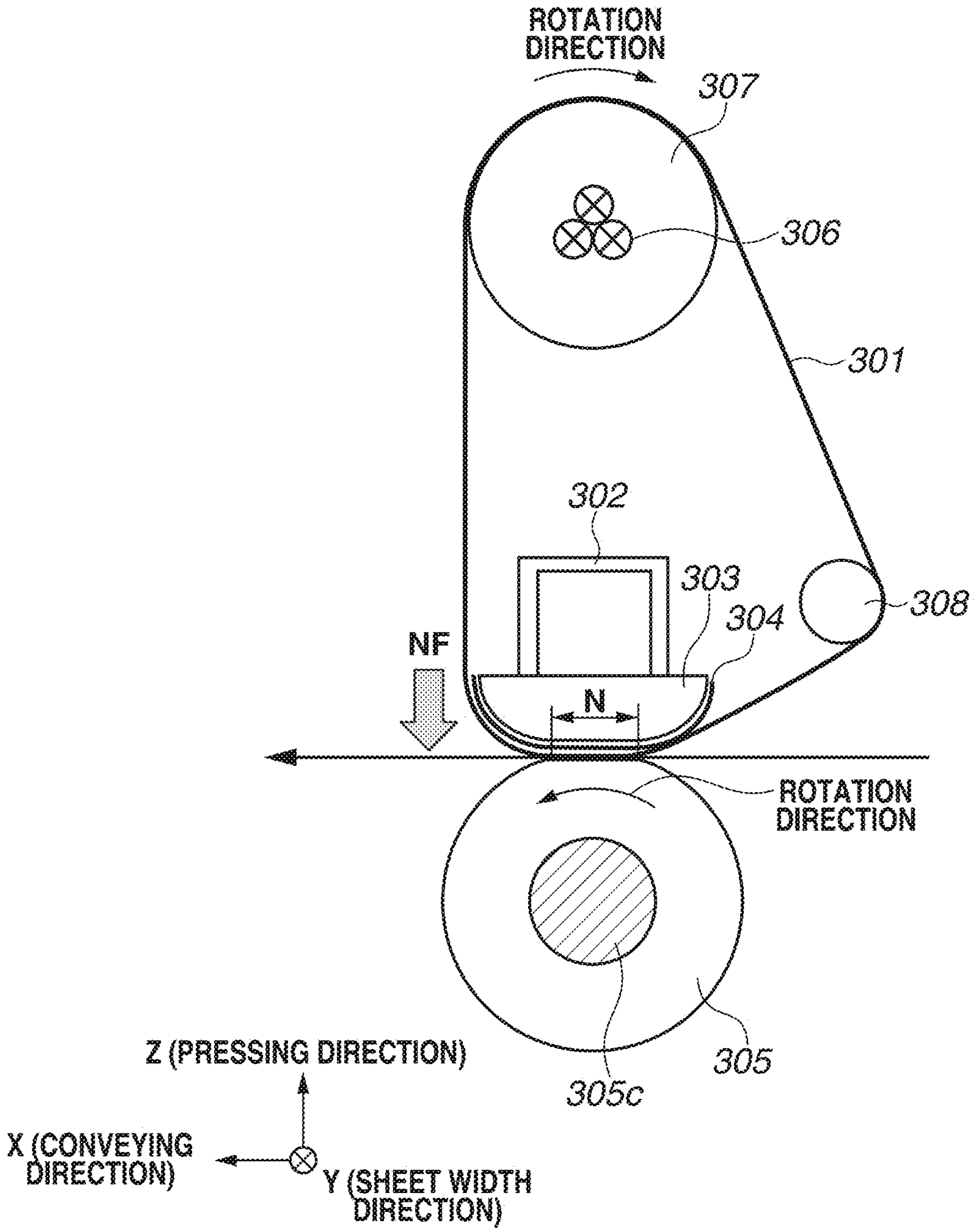
FIG. 3 is a cross-sectional view illustrating a fixing apparatus in a second example according to the present exemplary embodiment.

FIG. 3 is a schematic view of the overall configuration of the belt heating fixing apparatus F in the present example. In FIG. 3, an X direction represents the direction of conveying a sheet P (not illustrated), a Y direction represents the direction of the width of the sheet P, and a Z direction represents the direction of pressing.

The fixing apparatus F includes a fixing belt (hereinafter, referred to as a belt) 301 as a heating rotary member in an endless belt form. The fixing apparatus F further includes a pressing pad (hereinafter, referred to as a pad) 303 for supporting the fixing belt 301, a stay 302 for supporting the pad 303, and a sliding member 304 disposed over the pad 303. The fixing belt 301 is suspended by a heating roller 307 and a suspending roller 308. The fixing apparatus F further includes a pressing roller 305 as a pressing rotary member that forms a fixing nip portion N with the fixing belt 301.

The belt 301 is a thermal conductive and heatproof belt with other characteristics, and has a thin cylindrical shape. In the present exemplary embodiment, the fixing belt 301 has a three layer structure composed of a base layer, an elastic layer over the outer circumference of the base layer, and a mold release layer over the outer circumference of the elastic layer. The base layer is a PI material with a thickness of 80 μm. The elastic layer is formed of silicone rubber with a thickness of 300 μm. The mold release layer is formed of PFA copolymer resin as a fluorine resin with a thickness of 30 μm. The fixing belt 301 is suspended by the pad 303, the heating roller 307, and the suspending roller 308. The outside diameter of the fixing belt 301 is 150 mm.

The pad 303 is pressed via the fixing belt 301 by the pressing roller 305. The pad 303 is formed with a liquid crystal polymer (LCP) as a material. The sliding member 304 is disposed between the pad 303 and the fixing belt 301. The surface of the sliding member 304 has an embossed portion therein, and the embossed portion is coated with polytetrafluoroethylene (PTFE) with a thickness of 20 μm to achieve low friction. In addition, a lubricant is applied to the inner surface of the fixing belt 301, allowing the fixing belt 301 to slide on the sliding member 304 smoothly. The lubricant is silicone oil. The stay 302 is used to reinforce the strength of the pad 303.

The sliding member 304 in the present example is disposed over the pad 303, regardless of the inside or the outside of the nip portion N. Not illustrated here, a configuration that the sliding member 304 is disposed over a part of the fixing nip portion N can be employed. In other words, a configuration that the sliding member 304 is disposed over the fixing nip portion N alone can be employed.

The heating roller 307 is a stainless pipe with a thickness of 1 mm, and includes a halogen heater 306 as a heat source inside that allows generation of heat up to a predetermined temperature. The fixing belt 301 is heated by the heating roller 307.

The suspending roller 308 rotates around one end or about its center relative to the fixing belt 301, generating a tension difference ahead and behind, controlling the position of the fixing belt 301 in the main scanning direction. In addition, the suspending roller 308 is urged by a spring supported by a pull control frame (not illustrated) that fixes the suspending roller 308, and the suspending roller 308 also functions as a tension roller to apply a predetermined tension to the fixing belt 301.

The pressing roller 305 consists of a core metal layer 305*c*, an elastic layer over the core metal layer 305C as its shaft, and a mold release layer over the elastic layer. The shaft is formed of a SUS material with a diameter of 72 mm. The elastic layer is formed of electrically conductive silicone rubber with a thickness of 8 mm. The mold release layer is formed of PFA copolymer resin as a fluorine resin with a thickness of 100 μm. The pressing roller 305 is shaft-supported with a fixing frame (not illustrated) of the fixing apparatus F. One end of the pressing roller 305 is fixed to a gear connected to a drive source (not illustrated) that rotationally drives the pressing roller 305.

The sheet P with a toner image thereon is pinched and conveyed through the nip portion N formed between the fixing belt 301 and the pressing roller 305 through which the toner image is fixed to the sheet P. Thus, the fixing apparatus F fixes the toner image to the sheet P while conveying the sheet P being pinched. The fixing apparatus F therefore has both a function to apply heat and pressure and a function to convey the sheet P. The pressing roller 305 is pressed via the fixing belt 301 against the pad 303 by a drive source (not illustrated). The pressing force (NF) at the nip portion N in printing is 1,600 N. The nip portion N has a set width of 24.5 mm in the X direction (conveyance direction), and a set width of 336 mm in the Y direction (sheet width direction).

<Verification Experiment 2>

The effect according to the present exemplary embodiment was checked with the configuration of the fixing apparatus F in the second example. The result was much the same as in the first example as illustrated in FIG. 8, and the description will be omitted.

The parameter values in the corresponding simulation are similar to those in the first example. Even if an upstream member is changed, the effect of regulating the fixing belt 301 remains unchanged with a similar inverted crown shape, achieving the effect of reducing occurrences of paper wrinkle.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-096338, filed Jun. 15, 2022, which is hereby incorporated by reference herein in its entirety.

What is claimed is:

1. A fixing apparatus comprising:

a fixing belt that is rotatable and is configured to heat a recording material;

a heating roller configured to be in contact with an inner surface of the fixing belt and to heat the fixing belt;

a nip portion forming member configured to be in contact with the inner surface of the fixing belt and to suspend the fixing belt;

a pressing rotary member configured to form a nip portion by pressing the nip portion forming member via the fixing belt, wherein, with the fixing belt, the pressing rotary member is configured to pinch and convey the recording material and fix a toner image to the recording material;

a suspending roller that is disposed upstream of the nip portion forming member and downstream of the heating roller in a direction of rotation of the fixing belt and configured to suspend the fixing belt, wherein the suspending roller has a center and both ends in an area where the fixing belt and the suspending roller are in contact with each other in a width direction of the suspending roller, and wherein outside diameters at both of the ends of the suspending roller are greater than an outside diameter at the suspending roller center by a value between 50 micrometer (μm) and 300 μm, inclusive; and an urging unit configured to urge the suspending roller from the inner surface of the fixing belt toward an outer circumference surface of the fixing belt, wherein, in applying a force, the force that the urging unit applies to the suspending roller ranges between 50 newtons (N) and 100 N, inclusive.

2. The fixing apparatus according to claim 1, wherein a distance between the nip portion and the suspending roller ranges between 25 millimeter (mm) and 110 mm, inclusive.

3. The fixing apparatus according to claim 1, wherein the suspending roller is rotatably driven by rotation of the fixing belt.

4. The fixing apparatus according to claim 1, wherein the outside diameter at the suspending roller center is smallest in the area where the fixing belt and the suspending roller are in contact with each other.

5. The fixing apparatus according to claim 4, wherein the outside diameter becomes larger from the suspending roller center to both the ends in the width direction of the suspending roller.

6. The fixing apparatus according to claim 1, wherein an outside diameter of the heating roller is smaller at both the ends in the area where the fixing belt and the suspending roller are in contact with each other than at the suspending roller center in the area.

7. The fixing apparatus according to claim 1, wherein the nip portion forming member is a fixing roller that is rotatable, and the fixing roller has an elastic layer.

* * * * *